Patented Dec. 5, 1933

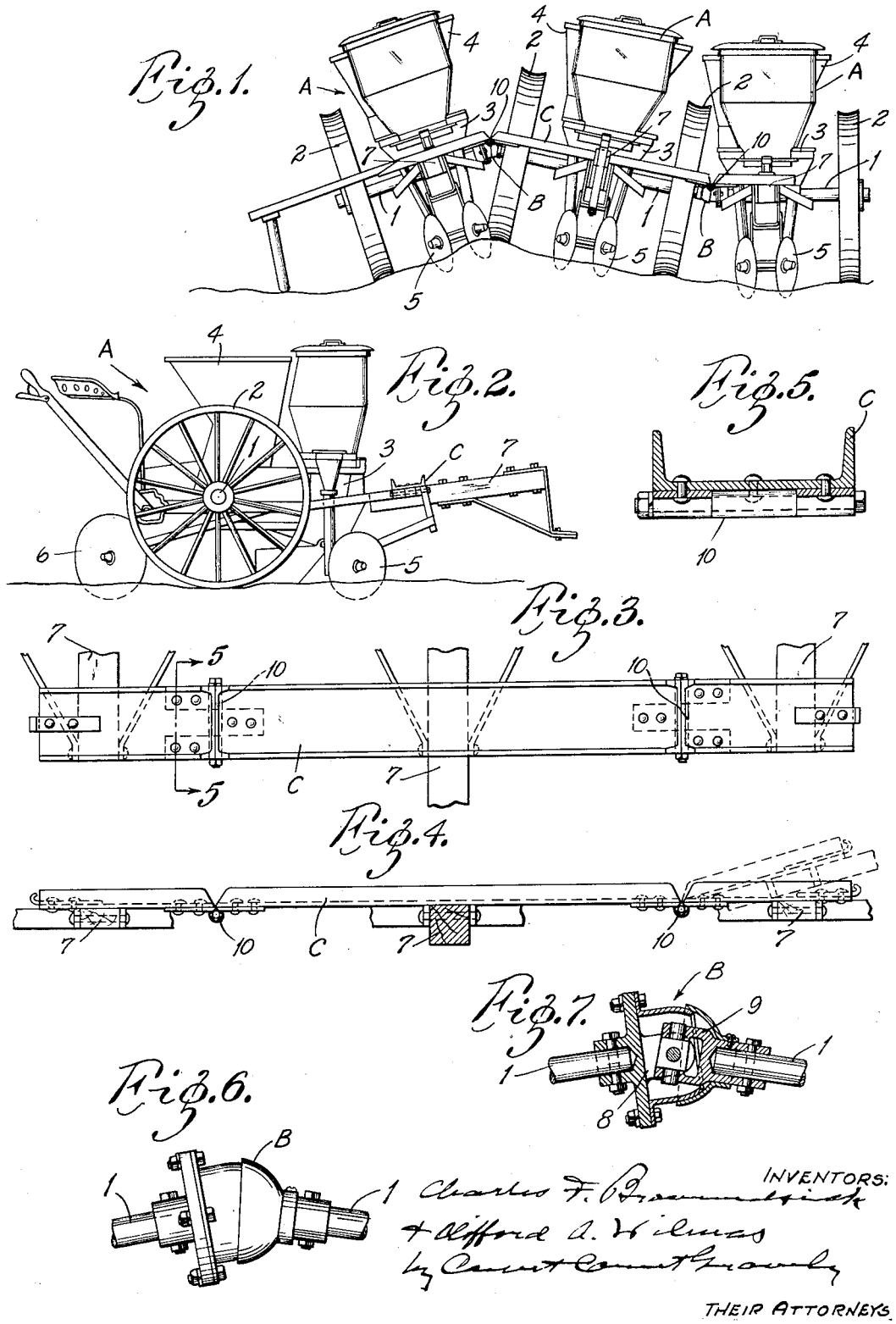

1,938,132

UNITED STATES PATENT OFFICE 1,938,132

AGRICULTURAL APPARATUS

Charles F. Broemmelsick and Clifford A. Wilmas, Chesterfield, Mo.

Application May 16, 1932. Serial No. 611,480

3 Claims. (Cl. 97—235)

This invention relates to agricultural apparatus of the type wherein a multiplicity of wheeled agricultural units are combined together for simultaneous operation. The invention has for its principal objects to provide a simple and efficient arrangement for quickly and easily connecting together a plurality of standard wheeled agricultural units to form an agricultural apparatus that will have the desired flexibility to permit proper operation of each unit on the irregular surface of the ground traversed; to dispense with the use of a framework for connecting together such units; to enable such units to be detached from the apparatus for individual operation; to dispense with some of the wheels of some of the associated units; and to provide for the easy turning of the apparatus in a minimum space. The invention consists in the multi-unit agricultural apparatus; and it also consists in the parts and combinations of parts and in the assembling method hereinafter described and claimed.

In the accompanying drawing, which forms part of this specification and wherein like symbols refer to like parts wherever they occur, Fig. 1 is a front elevation of a multi-unit agricultural apparatus embodying my invention, Fig. 2 is a side elevation of said apparatus, Fig. 3 is a fragmentary plan view of the front portion of the apparatus, showing the hinged connection between tongues of the units.

Fig. 4 is a front elevation of the parts shown in Fig. 3,

Fig. 5 is a vertical cross-section on the line 5—5 in Fig. 3,

Fig. 6 is a fragmentary elevation showing the universal joint connection between the adjacent end of the axles of adjacent units; and Fig. 7 is a longitudinal section through said universal joint.

The present multi-unit agricultural apparatus comprises three agricultural implements or units arranged side by side and combined together for simultaneous operation. Each of the agricultural implements or units A is shown in the form of a potato planter of conventional construction; but the invention is equally applicable to other wheeled planting and soil working implements. Each of the potato planters A used in forming the apparatus comprises an axle 1, wheels 2 on the ends thereof, a suitable frame 3 for supporting the planting mechanism, which includes a hopper 4 and the usual furrow opening and closing implements 5 and 6, and a forwardly projecting draft or tongue member 7.

The units of the apparatus are arranged side by side with their axles disposed end to end, and one of each two adjacent wheels is removed from its axle. In the three unit apparatus shown, the two wheels of the middle unit are left in place and the inner wheels of the two outer units are removed from the axles thereof. In cases where two units are used, one of the inner wheels is dispensed with; and in cases where more than three units are used, one of every two adjacent wheels is eliminated.

The units are operatively connected together for simultaneous operation as a single apparatus by means of universal joints B and by means of a sectional tie bar C. As shown in the drawing, the universal joints serve to flexibly connect the adjacent ends of the axles of adjacent units, and preferably comprise cooperating members 8 and 9 suitably connected one to each end of an axle. The sectional tie bar C extends parallel to the axles of the units across the tongues thereof. Said tie bar preferably comprises end and intermediate sections of substantially channel-shaped cross-section that are bolted or otherwise rigidly secured to the tongues of the respective units. The adjacent ends of said tie bar sections are flexibly connected together by suitable hinges 10, whose pivotal centers are substantially in line with the centers of the universal joint connections between the axles. The shafts or tongues of the end units terminate flush with the front edge of the hinged connecting bar C; and the shaft or tongue of the intermediate unit projects beyond said bar and serves as a hitch for attachment to a tractor or other pulling means.

The hereinbefore described agricultural apparatus has numerous advantages. It permits the units to be quickly and easily connected and disconnected for joint operation and independent operation. The hook-up forms an apparatus whose flexibility permits the individual units to follow the contour of the ground traversed and thus enables each unit to plant or cultivate at the same depth. It dispenses with the use of large and cumbersome frames for connecting the units; and it permits turning and storing of the apparatus in a comparatively small space. It also dispenses with some of the wheels of the units and, at the same time, provides a sufficient number of wheels to distribute the weight without excessive cutting or packing of the ground.

Obviously, the hereinbefore described apparatus admits of considerable modification without departing from the invention. Therefore, we do not wish to be limited to the precise hook-up and to the kind or number of units shown in the drawing.

What we claim:

1. A multi-unit agricultural apparatus comprising a plurality of standard agricultural units provided with duplicate wheeled axles, said units being arranged side by side with their axles disposed end to end and with one wheel removed from one of the two adjacent axle ends, universal joint driving connections between the ends of adjacent axles, and means for flexibly connecting together the front portions of said units, said means comprising members rigidly fixed to the respective units and arranged end to end substantially parallel to the axles of said units, and means for hingedly connecting together the members of adjacent units at points substantially in line with said universal joints.

2. A multi-unit agricultural apparatus comprising a plurality of agricultural units provided with wheeled axles, said units being arranged side by side with their axles disposed end to end, universal joint connections between the ends of adjacent axles, means for flexibly connecting together the front portions of said units, said means comprising channel-shaped members rigidly fixed to the tongues of respective units and arranged end to end substantially parallel to the axles of said units, and means for hingedly connecting together the members of adjacent units at points substantially in line with the universal joint connections between the axles thereof.

3. A multi-unit agricultural apparatus comprising a plurality of standard wheeled agricultural units provided with duplicate axles, said units being arranged side by side with their axles disposed end to end, universal joint driving connections between the ends of the axles of adjacent units each of said units being provided with tongues, means for flexibly connecting together the tongues of adjacent units, said means comprising members rigidly fixed to the tongues of the respective units and arranged end to end substantially parallel to the axles of said units, and means for hingedly connecting together the members of adjacent units at points substantially in line with the universal joint connections between the shafts thereof.

CHARLES F. BROEMMELSICK.
CLIFFORD A. WILMAS.